(12) United States Patent
Urai et al.

(10) Patent No.: US 8,521,414 B2
(45) Date of Patent: Aug. 27, 2013

(54) VEHICLE SAFETY DRIVING APPARATUS

(75) Inventors: Yoshihiro Urai, Wako (JP); Jun Ochida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 773 days.

(21) Appl. No.: 12/532,778

(22) PCT Filed: Feb. 20, 2008

(86) PCT No.: PCT/JP2008/052813
§ 371 (c)(1),
(2), (4) Date: Sep. 23, 2009

(87) PCT Pub. No.: WO2008/126474
PCT Pub. Date: Oct. 23, 2008

(65) Prior Publication Data
US 2010/0121532 A1    May 13, 2010

(30) Foreign Application Priority Data
Mar. 30, 2007    (JP) .................................. 2007-094283

(51) Int. Cl.
*G08G 1/16*    (2006.01)

(52) U.S. Cl.
USPC ............................................ 701/301; 701/41

(58) Field of Classification Search
USPC ..................... 701/41, 42, 301; 180/443, 446; 340/435, 465
See application file for complete search history.

(56) References Cited

U.S. PATENT DOCUMENTS

| | | | | |
|---|---|---|---|---|
| 5,925,082 | A * | 7/1999 | Shimizu et al. | 701/41 |
| 6,256,584 | B1 * | 7/2001 | Kodaka et al. | 701/301 |
| 7,734,418 | B2 * | 6/2010 | Shoda et al. | 701/301 |
| 7,893,819 | B2 * | 2/2011 | Pfeiffer et al. | 340/435 |
| 2006/0025893 | A1 * | 2/2006 | Fischer et al. | 701/1 |
| 2007/0010945 | A1 * | 1/2007 | Shoda et al. | 701/301 |
| 2009/0212930 | A1 * | 8/2009 | Pfeiffer et al. | 340/435 |

FOREIGN PATENT DOCUMENTS

| | | |
|---|---|---|
| JP | 07-117593 A | 5/1995 |
| JP | 2000-626385 A | 2/2000 |
| JP | 2000-67393 A | 3/2000 |
| JP | 2000-285105 A | 10/2000 |
| JP | 2002-339246 A | 11/2002 |
| JP | 2004-30361 A | 1/2004 |
| JP | 2004-330972 A | 11/2004 |
| JP | 2005-149021 A | 6/2005 |
| JP | 2006-131072 A | 5/2006 |
| JP | 2006-298294 A | 11/2006 |
| WO | WO 2006/037551 * | 4/2006 |
| WO | WO-2006/037551 A2 | 4/2006 |
| WO | WO-2006/092431 A1 | 9/2006 |

* cited by examiner

*Primary Examiner* — Thomas Black
*Assistant Examiner* — Ce Li
(74) *Attorney, Agent, or Firm* — Arent Fox LLP

(57) ABSTRACT

In a vehicle safety driving apparatus, a predetermined steering torque is applied as the warning and a change amount of driver's steering torque relative to the applied predetermined steering torque is calculated, and a contact avoidance assistance operation is conducted in place of applying the predetermined steering torque when the calculated driver's steering force change amount is less than a set value. With this, it becomes possible to conduct more perceivable operation or vehicle control when it is estimated that the driver does not recognize it, thereby enabling to assist the contact avoidance appropriately.

12 Claims, 6 Drawing Sheets

VEHICLE SAFETY DRIVING APPARATUS

CROSS-REFERENCE TO RELATED APPLICATIONS

This application is a National Stage entry of International Application No. PCT/JP2008/052813, filed Feb. 20, 2008, which claims priority to Japanese Patent Application No. JP2007-094283, filed Mar. 30, 2007, the disclosure of the prior applications is hereby incorporated in their entirety by reference.

TECHNICAL FIELD

This invention relates to a vehicle safety driving apparatus, more specifically to an apparatus that detects obstacles such as vehicles ahead of or in the surroundings of a vehicle (subject vehicle) and assists avoidance of contact therewith.

BACKGROUND ART

There is known an apparatus that detects and recognizes obstacles such as vehicles ahead using an electromagnetic wave radar mounted on a vehicle, determines possibility of contact with the obstacles, and performs operation for assisting avoidance of contact with the obstacles by implementing vehicle control of alerting, steering, etc., when it is determined that there is a possibility of contact. Patent Reference 1 proposed by the applicant earlier can be cited as an example thereof. The conventional technique is configured to control to prevent the vehicle from deviating from the proper course of travel in the case where an obstacle (oncoming vehicle) is approaching the vehicle. Patent Reference 1: Japanese Patent Publication 2006-131072

DISCLOSURE OF THE INVENTION

Problems to be Solved by the Invention

In the conventional technique, avoidance of contact is assisted by controlling the vehicle not to deviate from the proper course of travel. In addition, the contact avoidance assistance may be implemented by applying steering torque (reaction force) to a steering wheel to give a warning for urging the driver to conduct the avoidance operation. In this case, since the contact avoidance can not be assisted properly when the driver does not recognize or perceive the warning of the applied steering torque, it is necessary to estimate whether the driver has recognized the warning and, if not, make him/her aware of it.

The object of this invention is therefore to overcome this problem by providing a vehicle safety driving apparatus that, when it is determined that there is a possibility of contact, conducts contact avoidance assistance operation for avoiding contact with detected obstacles by giving a warning or implementing vehicle control and, while applying predetermined steering torque as a warning, estimates whether the driver has recognized the warning of the applied steering torque and, if not, makes him/her aware of it, thereby assisting avoidance of contact appropriately.

Means for Solving the Problems

In order to achieve the object, as recited in claim 1 mentioned below, this invention is configured to have a vehicle safety driving apparatus having: object detection means for detecting an object present around a vehicle; motion state detection means for detecting a state of motion of the vehicle; contact possibility determination means for determining a possibility of contact with the detected object based on the detected state of motion; and contact avoidance assistance means for recognizing the object as an obstacle when it is determined that there is a possibility of contact with the object and for conducting operation of assisting avoidance of contact with the recognized obstacle by a warning or vehicle control, characterized by: steering torque applying means for applying a predetermined steering torque as the warning; and driver's steering force change amount calculation means for calculating a change amount of driver's steering force relative to the applied predetermined steering torque, and the contact avoidance assistance means conducts contact avoidance assistance operation in place of applying the predetermined steering torque when the calculated driver's steering force change amount is less than a set value.

As recited in claim 2 mentioned below, the vehicle safety driving apparatus is configured such that the contact avoidance assistance means conducts more perceivable operation as the warning when the calculated driver's steering force change amount is less than the set value.

As recited in claim 3 mentioned below, the vehicle safety driving apparatus is configured such that the contact avoidance assistance means conducts the contact avoidance assistance operation by the vehicle control when the calculated driver's steering force change amount is less than the set value.

As recited in claim 4 mentioned below, the vehicle safety driving apparatus is configured such that the contact avoidance assistance means conducts the contact avoidance assistance operation by the vehicle control and corrects the contact avoidance assistance operation to be safer when the calculated driver's steering force change amount is less than the set value.

As recited in claim 5 mentioned below, the vehicle safety driving apparatus is configured to further include: steering angle change amount calculation means for calculating a change amount of steering angle of a steering wheel relative to the applied predetermined steering torque, and the contact avoidance assistance means enhances the contact avoidance assistance operation when the calculated driver's steering force change amount is less than the set value and the calculated steering angle change amount of the steering wheel is less than a second set value.

As recited in claim 6 mentioned below, the vehicle safety driving apparatus is configured to further include: steering angle change amount calculation means for calculating a change amount of steering angle of a steering wheel relative to the applied predetermined steering torque, and the contact avoidance assistance means applies a correction torque in a direction opposite from a direction in which the predetermined steering torque is applied when the calculated steering angle change amount of the steering wheel is greater than a third set value.

Effects of the Invention

The vehicle safety driving apparatus mentioned in claim 1 is configured such that a predetermined steering torque is applied as the warning and a change amount of driver's steering force relative to the applied predetermined steering torque is calculated, and a contact avoidance assistance operation is conducted in place of applying the predetermined steering torque when the calculated driver's steering force change amount is less than a set value. In other words, it is configured such that it is estimated whether the driver recognizes the warning by determining if the calculated driver's steering force change amount is less than a set value and when it is estimated that the driver does not recognize the warning, a contact avoidance assistance operation is conducted in place of it. With this, it becomes possible to conduct more perceivable operation or vehicle control when it is estimated that the driver does not recognize it, thereby enabling to assist the contact avoidance appropriately.

Since the vehicle safety driving apparatus recited in claim 2 is configured such that more perceivable operation is conducted as the warning when the calculated driver's steering force change amount is less than the set value, in addition to the effects mentioned above, it becomes possible to make the driver recognize it more surely, thereby enabling to assist the contact avoidance appropriately.

Since the vehicle safety driving apparatus recited in claim 3 is configured such that the contact avoidance assistance operation by the vehicle control is conducted when the calculated driver's steering force change amount is less than the set value, in addition to the effects mentioned above, it becomes possible to compensate the delay in reaction due to not perceiving the warning, thereby enabling to assist the avoidance of contact appropriately.

Since the vehicle safety driving apparatus recited in claim 4 is configured such that the contact avoidance assistance operation by the vehicle control is conducted and the contact avoidance assistance operation is corrected to be safer when the calculated driver's steering force change amount is less than the set value, in addition to the effects mentioned above, it becomes possible to compensate the delay in reaction due to not perceiving the warning more reliably, thereby enabling to assist the avoidance of contact more appropriately.

Since the vehicle safety driving apparatus recited in claim 5 is configured such that a change amount of steering angle of a steering wheel relative to the applied predetermined steering torque is calculated, and the contact avoidance assistance operation is enhanced when the calculated driver's steering force change amount is less than the set value and the calculated steering angle change amount of the steering wheel is less than a second set value, in addition to the effects mentioned above, it becomes possible to improve the estimation accuracy on the driver's perception, thereby enabling to assist the avoidance of contact more appropriately.

Since the vehicle safety driving apparatus recited in claim 6 is configured such that a change amount of steering angle of a steering wheel relative to the applied predetermined steering torque is calculated, and a correction torque is applied in a direction opposite from a direction in which the predetermined steering torque is applied when the calculated steering angle change amount of the steering wheel is greater than a third set value, in addition to the effects mentioned above, even if the steering torque comes to excessive, the generation of excessive behavior of the vehicle or the like can be prevented.

BEST MODES OF CARRYING OUT THE INVENTION

Preferred embodiments for carrying out a vehicle safety driving apparatus according to the present invention will now be explained with reference to the attached drawings.

First Embodiment

Figure 1:
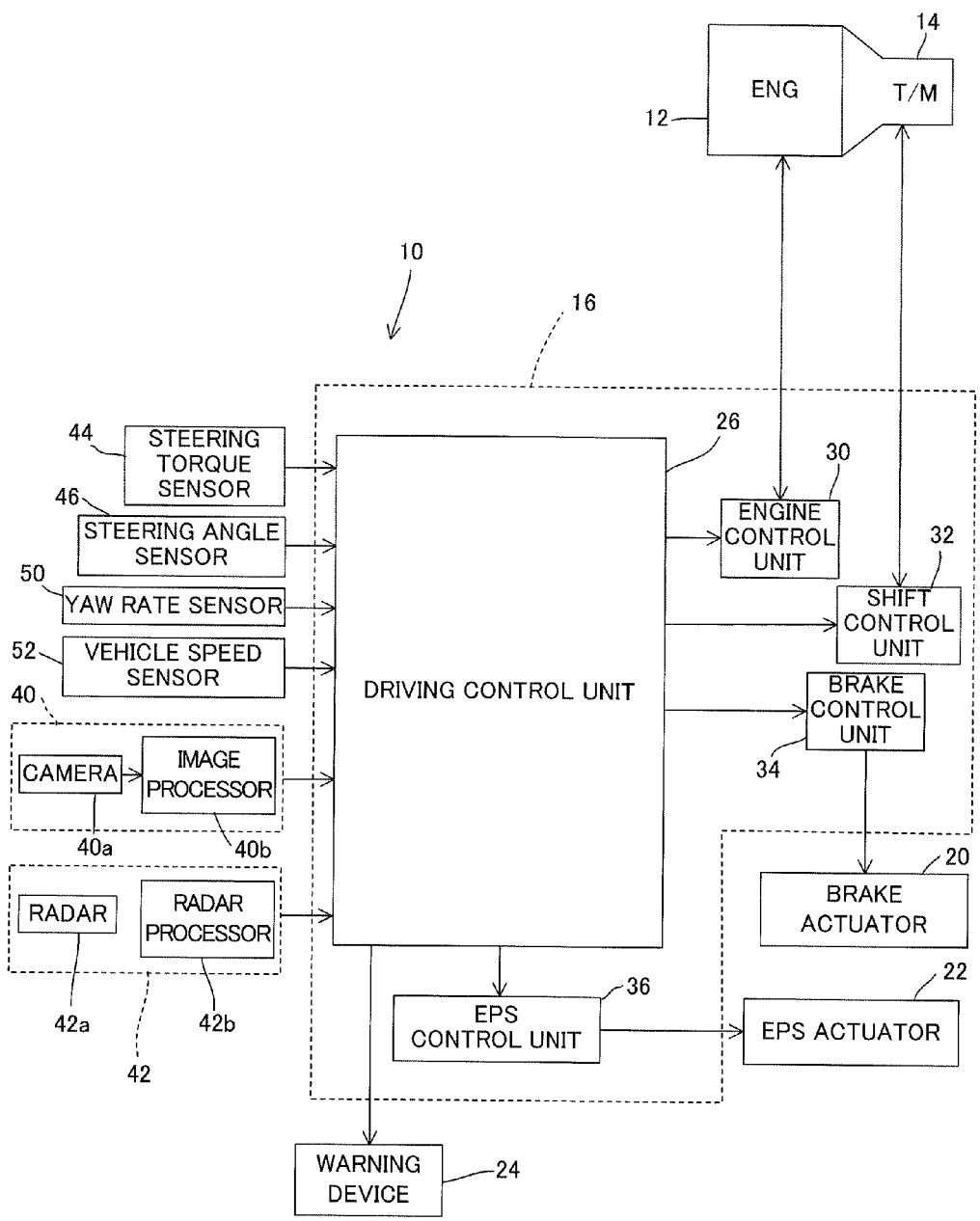
FIG. 1 is an overall schematic view showing a vehicle safety driving apparatus according to a first embodiment of this invention.

FIG. 1 is an overall schematic view showing a vehicle safety driving apparatus according to a first embodiment of this invention.

Symbol 10 in FIG. 1 designates the vehicle safety driving apparatus. The apparatus 10 is mounted on a vehicle (subject vehicle; not shown) whose drive wheels (not shown) are supplied through an automatic transmission (denoted T/M in the drawing) 14 with drive power from an internal combustion engine (denoted ENG in the drawing; hereinafter called "engine") 12. The apparatus 10 is equipped with a control unit 16, brake actuator 20, EPS (Electric Power Steering) actuator 22, and warning device 24.

The control unit 16 includes a driving control unit 26, engine control unit 30, shift control unit 32, brake control unit 34, and EPS control unit 36. These control units are all equipped with microcomputers and configured to enable communication with one another.

The driving control unit 26 functions such as contact avoidance assistance means that conducts contact avoidance assistance operation which will be explained later. The engine control unit 30 and shift control unit 32 control the operation of the engine 12 and automatic transmission 14. However, no explanation of their operation will be given because it is not directly related to the gist of this invention.

The brake actuator 20 comprises a master vacuum (not shown) that amplifies brake pedal (not shown) depression force and a master cylinder (not shown) that uses the amplified depression force to produce braking pressure for operating brakes installed at drive wheels and driven wheels through a brake hydraulic mechanism (not shown).

The brake control unit 34 is connected to the brake actuator 20. The brake control unit 34 is responsive to commands from the driving control unit 26 to brake (slow) the vehicle moving by operating independently of driver's brake pedal operation so as to perform automatic braking by operating the brake actuator 20 through the brake hydraulic mechanism.

Taking as an example the case where the front wheels are the drive wheels, the EPS actuator 22 comprises an electric motor mounted on a rack (not shown) in a mechanism that converts, via a pinion, rotary motion of a steering wheel (not shown) transmitted from a steering shaft or the like to reciprocal motion of the rack for steering the front wheels through tie rods (not shown).

The EPS control unit 36 is connected to the EPS actuator 22. The EPS control unit 36 is responsive to commands from the driving control unit 26 for operating the EPS actuator 22 to impart steering torque to the driver.

The warning device 24 is equipped with an audio speaker and an indicator (neither shown) situated near the driver's seat of the vehicle and is connected to the driving control unit 26. The driving control unit 26 operates the warning device 24 to alert the driver by audible and visible warnings.

The driving control unit 26, as needed, further operates a drive mechanism of a seatbelt located at the driver's seat of the vehicle to draw and tighten the seatbelt, or operates the EPS actuator 22 through the EPS control unit 36 to make the steering wheel vibrate, thereby alerting the driver.

In addition to the foregoing components, the apparatus 10 is also equipped with sensors, as illustrated.

Explaining in the following, an imaging device 40 has a camera 40a comprising a CCD (Charge-Coupled Device) camera or C-MOS (Complementary-Metal Oxide Semiconductor) camera and an image processor 40b. The camera 40a is installed on the windshield near the rearview mirror in the passenger compartment of the vehicle. It takes images through the windshield in the forward direction of vehicle travel. The image processor 40b receives the images taken by the camera 40a, subjects them to image processing, such as filtering and binarization, and outputs the resulting image data to the driving control unit 26.

A radar device 42 is mounted at, for example, the nose of the body of the vehicle and comprises a radar 42a that transmits (sends) a laser beam, microwaves or other electromagnetic waves into the surroundings of the vehicle such as forward thereof in the direction of travel, for instance, and a radar processor 42b that receives the electromagnetic waves reflected from objects present around the vehicle. The radar processor 42b detects objects from presence/absence of the reflected electromagnetic waves. When the radar processor 42b detects an object, it further determines the distance from the object, and the direction and moving speed of the object, and sends the information to the driving control unit 26.

A steering torque sensor 44 installed between the steering wheel and EPS actuator 22 produces an output or signal corresponding to the direction and magnitude of steering force (steering torque) inputted (applied) by the driver through the steering wheel.

A steering angle sensor 46 installed near the steering shaft produces an output or signal corresponding to the direction and magnitude of a steering angle inputted (applied) by the driver through the steering wheel, i.e., a steered angle of the steering wheel.

A yaw rate sensor 50 installed near the center of gravity of the vehicle produces an output or signal corresponding to the yaw rate (rotational angular velocity) of the vehicle around its vertical axis (yaw axis).

A vehicle speed sensor 52 installed near the driveshaft (not shown) of each drive wheel produces an output or signal of pulse once per predetermined number of drive wheel rotations. The outputs of these sensors are also sent to the driving control unit 26. The driving control unit 26 detects the steering torque, etc., based on the inputted values, and detects the vehicle speed by counting the outputs of the vehicle speed sensors 52.

Figure 2:
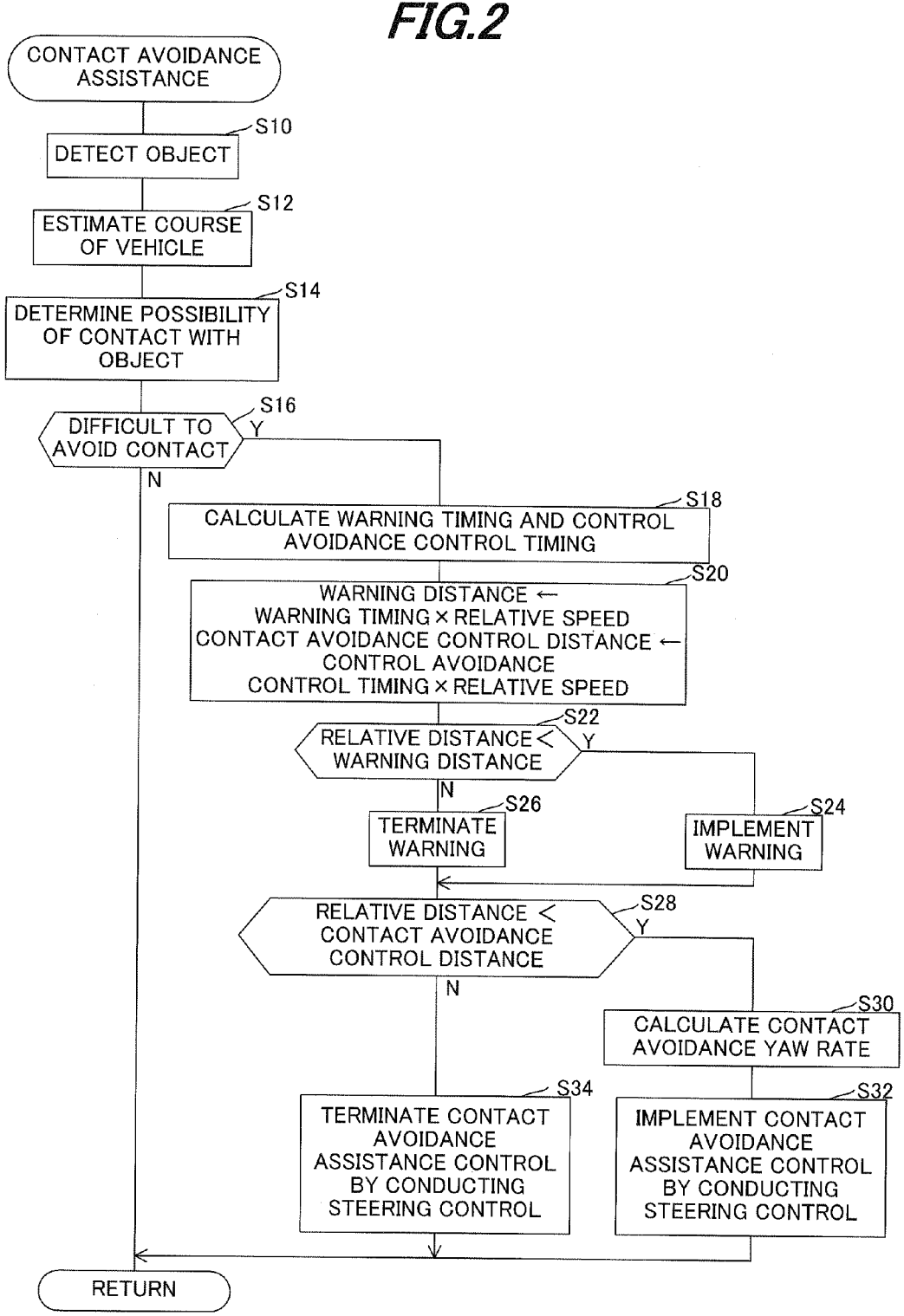
FIG. 2 is a flowchart showing the sequence of contact avoidance assistance operation executed by the apparatus shown in FIG. 1.

FIG. 2 is a flowchart showing the sequence of contact avoidance assistance operation executed by the apparatus 10 shown in FIG. 1, more precisely the driving control unit 26 of the control unit 16 of the apparatus 10.

Explaining in the following, in S10, any object (e.g., a vehicle ahead, etc.) located around the vehicle (subject vehicle) is detected based on the outputs of the imaging device 40 or radar device 42, and the position and speed of the detected object relative to the vehicle is detected. Next, in S12, the course of the vehicle is estimated from the speed and yaw rate of the vehicle.

Figure 3:
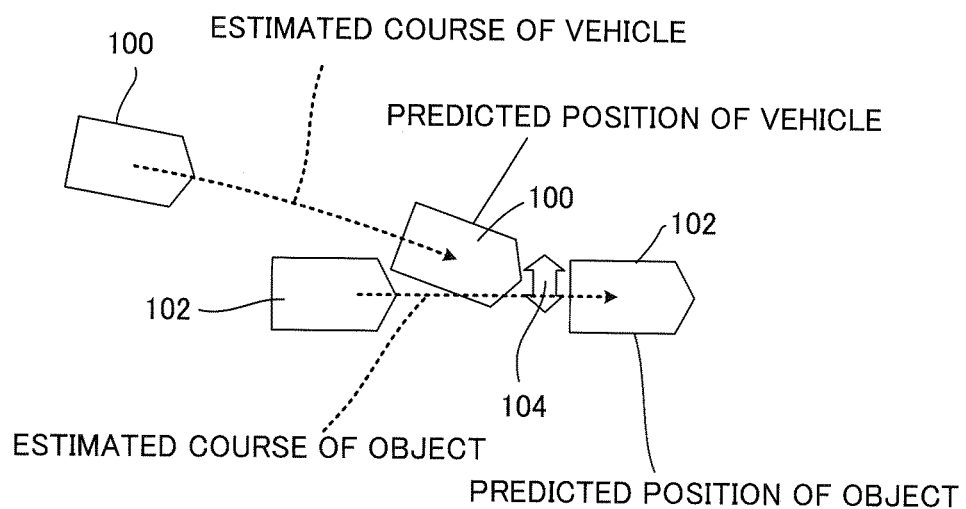
FIG. 3 is an explanatory view showing the positional relationship between a vehicle (subject vehicle) and an obstacle for explaining the processing of determining a possibility of contact in the FIG. 2 flowchart.

Next, in S14, it is determined whether there is a possibility of contact with the object based on the relative position and speed with the object and the course of the vehicle, and recognizes the object as an obstacle when it is determined that there is a possibility of contract. For example, as shown in FIG. 3, based on the estimated course of the vehicle (indicated by reference 100) and a predicted course of the object (indicated by reference 102) predicted from change of the position of the object 102, predicted positions of the vehicle 100 and object 102, where the distance between the vehicle 100 and object 102 becomes zero, are estimated, while an overlap amount 104 thereof is calculated. When the amount 104 is equal to or greater than a predetermined value, it is determined that there is a possibility of contact and the object 102 is recognized as an obstacle.

Next, in S16, it is determined whether contact with the object has been discriminated to be difficult to avoid, i.e., there is a possibility of contact with the object, and when the result is negative, the remaining steps are skipped. When the result is affirmative, in S18, a warning timing and contact avoidance control timing are calculated based on the overlap amount. Next, in S20, the value calculated in S18 is multiplied by the relative speed detected in S10 to obtain a warning distance and contact avoidance control distance.

Next, in S22, it is determined whether the relative distance is less than the warning distance, and when the result is affirmative, in S24, the warning is implemented, specifically, a predetermined steering torque (e.g., 10 kgfcm) is applied to the steering wheel through the EPS control unit 36 and EPS actuator 22 (hereinafter called "warning by steering") for warning the driver. On the other hand, when the result in S22 is negative, in S26, the warning is terminated because it is not necessary.

Figure 4:
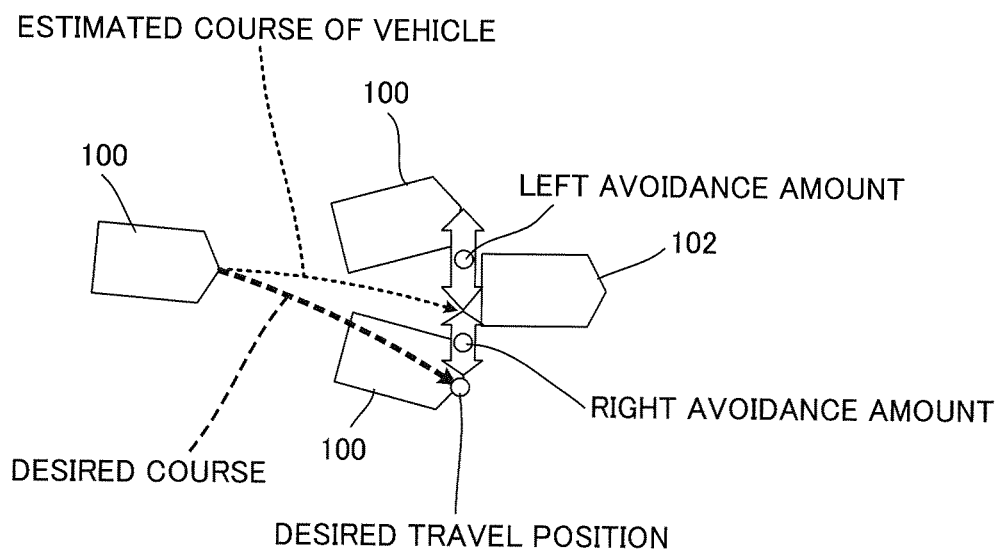
FIG. 4 is an explanatory view similarly showing the positional relationship between the vehicle (subject vehicle) and the obstacle, but for explaining the calculation processing of a contact avoidance yaw rate in the FIG. 2 flowchart.

Next, in S28, it is determined whether the relative distance is less than the contact avoidance control distance and when the result is affirmative, in S30, a contact avoidance yaw rate is calculated. Specifically, as shown in FIG. 4, in order to set a desired course for avoiding contact, a left avoidance amount used to avoid the obstacle 102 to the left and a right avoidance amount used to avoid it to the right are calculated, a desired travel position is set to determine the desired course in the direction in which the avoidance amount is smaller, i.e., in the right direction in the illustrated example, and then a desired yaw rate used for passing the desired travel position is calculated.

Next, in S32, the contact avoidance assistance control (contact avoidance assistance operation) is implemented by conducting the steering control. Specifically, the steering torque is controlled through the EPS control unit 36 and EPS actuator 22 such that the actual yaw rate detected by the yaw rate sensor 50 becomes close to the desired yaw rate.

A steering torque control amount is calculated from the desired yaw rate and the vehicle speed detected by the vehicle speed sensor 52 (k: coefficient), as follows:

Steering torque control amount=$k$×Vehicle speed× Desired yaw rate

In S32, the feedback control may be conducted to eliminate the error between the desired yaw rate and actual yaw rate. When the result in S28 is negative, in S34, the contact avoidance assistance control by conducting the steering control is terminated because it is not necessary.

Figure 5:
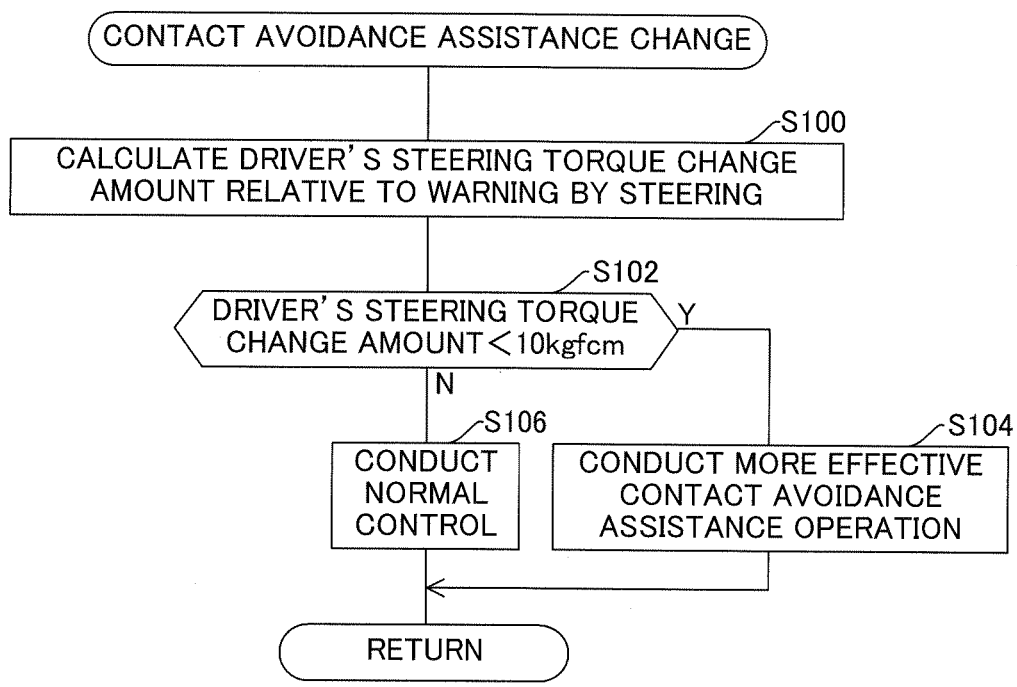
FIG. 5 is a flowchart showing the sequence of contact avoidance assistance change operation executed in parallel with the processing of FIG. 2.

FIG. 5 is a flowchart showing the sequence of contact avoidance assistance change operation executed by the driving control unit 26 in parallel with the processing of S24 of FIG. 2 flowchart.

Figure 6:
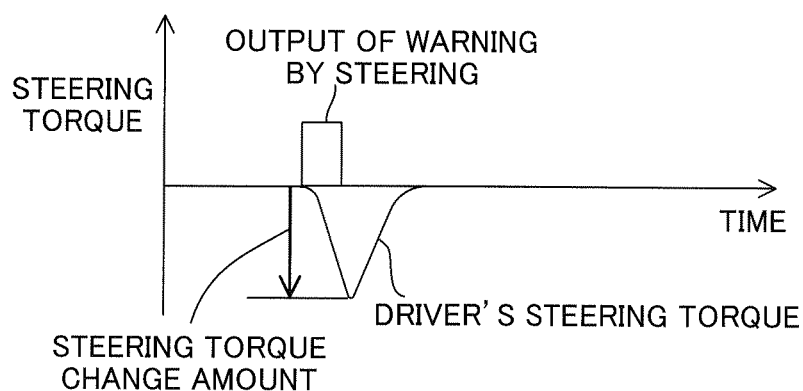
FIG. 6 is an explanatory time chart showing the calculation processing of a change amount of steering torque (steering force) of the driver shown in FIG. 5.

Explaining in the following, in S100, a driver's steering torque (steering force) change amount relative to the warning by steering given in the step of S24 is calculated. Specifically, as shown in FIG. 6, the steering torque by the driver at a time before giving (outputting) the warning by steering and the driver's steering torque change amount during a predetermined time period (e.g., 100 milliseconds) since starting to give the warning by steering, are calculated.

Next, in S102, it is determined whether the calculated driver's steering torque change amount is less than a set value (e.g., 10 kgfcm). For instance, in the case where, under the condition shown in FIG. 4, the warning by steering (predetermined steering torque) is given to steer the vehicle 100 rightward, once recognizing it, the driver should reflexively strengthen the force to grip the steering wheel, so that the driver's steering torque of a greater value than the set value must be generated leftward.

When the result in S102 is affirmative, since it means that the driver did not recognize the warning, in S104, another contact avoidance assistance operation in place of applying the aforementioned predetermined steering torque, specifically more effective (in other words, more perceivable) contact avoidance assistance operation as the warning, or the contact avoidance assistance operation by vehicle control is conducted.

The more perceivable operation as the warning includes applying steering torque (e.g., 15 kgfcm) exceeding the predetermined value (10 kgfcm), applying steering torque intermittently, making the steering wheel vibrate, giving the audible or visible warning through the audio speaker or indicator, and drawing and tightening the seatbelt. One or more operations from among the above is selected and conducted.

In the case where, in S104, another contact avoidance assistance operation in place of applying the predetermined steering torque, i.e., the contact avoidance assistance operation by vehicle control is conducted, the control (operation) similar to that explained on the step of S30 and the subsequent steps is implemented. Specifically, regardless of whether or not the relative distance is less than the contact avoidance control distance, the contact avoidance assistance control (operation) by steering control is implemented such that the actual yaw rate approaches the desired yaw rate.

In this case, in addition to the steering control, the brake assist may be implemented by performing automatic braking through the brake control unit 34 and brake actuator 20 so as to slow the speed of the vehicle 100.

For correcting the contact avoidance assistance operation by vehicle control to be safer, examples can be given in which a value of the contact avoidance control timing is corrected to increase so as to conduct the contact avoidance assistance control explained in S30 and the subsequent steps at the timing earlier than the ordinary, the coefficient k used for calculating the steering torque control amount is corrected to increase, a feedback gain used in the feedback control is corrected to increase for enhancing the response, and so on.

When the result in S102 is negative, since it means that the driver recognizes the warning, in S106, the normal control, i.e., the control such as the warning described in S24 is conducted.

The vehicle safety driving apparatus according to the first embodiment is configured such that a predetermined steering torque is applied as the warning and a change amount of driver's steering torque (steering force) relative to the applied predetermined steering torque is calculated, and a contact avoidance assistance operation is conducted in place of applying the predetermined steering torque when the calculated driver's steering force change amount is less than a set value. In other words, it is configured such that it is estimated whether the driver recognizes the warning by determining if the calculated driver's steering force change amount is less than a set value and when it is estimated that the driver does not recognize the warning, a contact avoidance assistance operation is conducted in place of it. With this, it becomes possible to conduct more perceivable operation or vehicle control when it is estimated that the driver does not recognize it, thereby enabling to assist the contact avoidance appropriately.

Further, since it is configured such that more perceivable operation is conducted as the warning when the calculated driver's steering force change amount is less than the set value, in addition to the effects mentioned above, it becomes possible to make the driver recognize it more surely, thereby enabling to assist the contact avoidance appropriately.

Further, since it is configured such that the contact avoidance assistance operation by the vehicle control is conducted when the calculated driver's steering force change amount is less than the set value, in addition to the effects mentioned above, it becomes possible to compensate the delay in reaction due to not perceiving the warning, thereby enabling to assist the avoidance of contact appropriately.

Further, it is configured such that the contact avoidance assistance operation by the vehicle control is conducted and the contact avoidance assistance operation is corrected to be safer when the calculated driver's steering force change amount is less than the set value, in addition to the effects mentioned above, it becomes possible to compensate the delay in reaction due to not perceiving the warning more reliably, thereby enabling to assist the avoidance of contact more appropriately.

Second Embodiment

Figure 7:
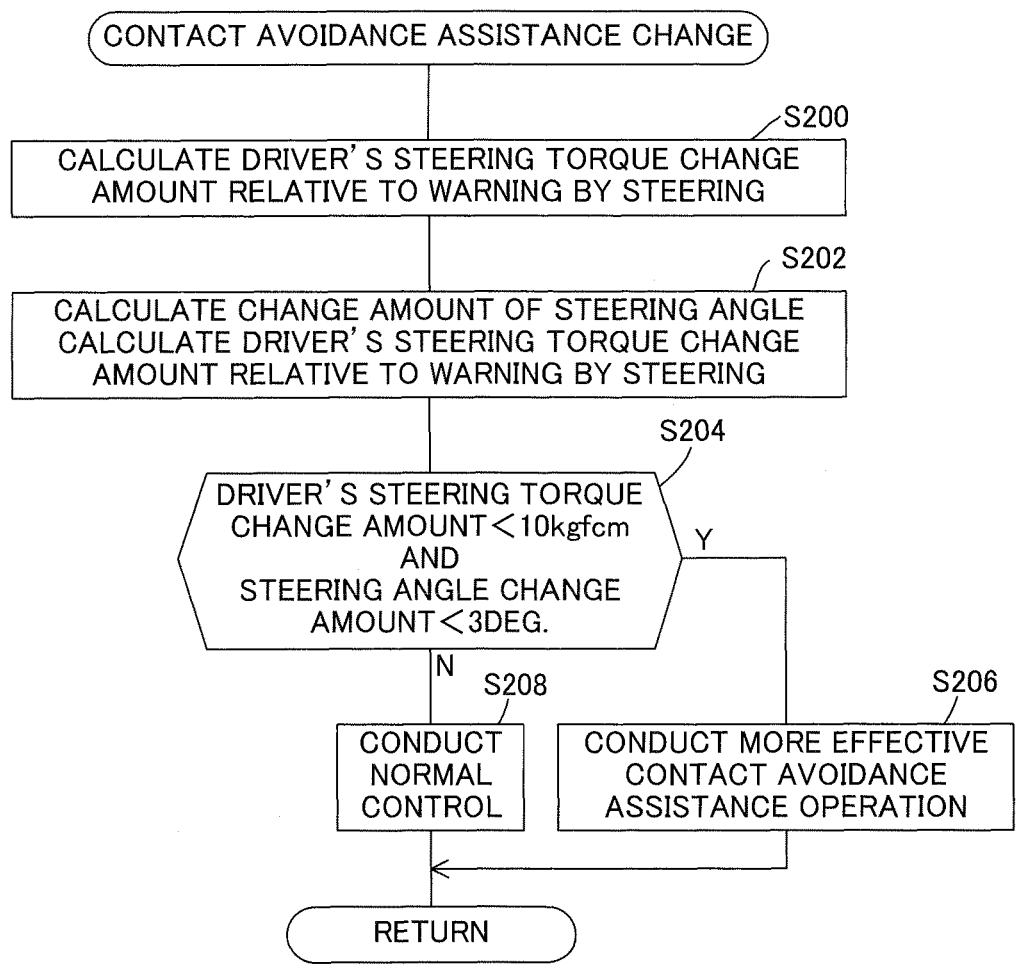
FIG. 7 is a flowchart showing the sequence of contact avoidance assistance change operation executed in parallel with the processing of FIG. 2 by a vehicle safety driving apparatus according to a second embodiment of this invention.

FIG. 7 is a flowchart showing the operation of a vehicle safety driving apparatus according to a second embodiment of this invention, more precisely another example of the sequence of contact avoidance assistance change operation executed by the driving control unit 26 in parallel with the processing of S24 in FIG. 2.

Figure 8:
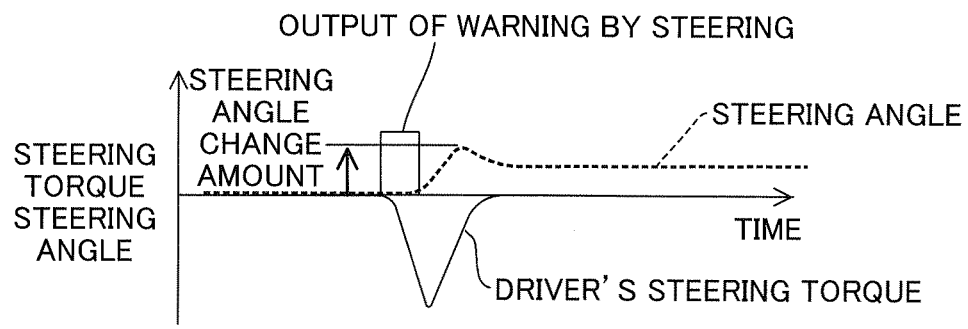
FIG. 8 is an explanatory time chart showing the calculation processing of change amounts of steering torque (steering force) of the driver and steering angle of a steering wheel shown in FIG. 7.

Explaining in the following, in S200, a driver's steering torque (steering force) change amount relative to the warning by steering given in the step of S24 is calculated, and in S202, similarly a change amount of steering angle of the steering wheel relative to the warning by steering given in the step of S24 is calculated. Specifically, as indicated by a dashed line in FIG. 8, the steering angle of the driver before giving the warning by steering and the steering wheel's steering angle change amount during a predetermined time period (e.g., 100 milliseconds) since starting to give the warning by steering, are calculated.

Next, in S204, it is determined whether the calculated driver's steering torque change amount is less than the set value (e.g., 10 kgfcm) and whether the calculated steering angle change amount is less than a second set value (e.g., 3 degrees).

For instance, under the condition shown in FIG. 4, in the case where the warning by steering is given to steer the vehicle 100 rightward, the driver should be able to recognize the warning upon changing to some extent in steering angle of the steering wheel. Therefore, it becomes possible to determine whether the driver has recognized the warning by comparing the steering angle change amount with the appropriately-set second set value, in addition to using the steering torque.

When the result in S204 is affirmative, since it means that the driver has not recognized the warning, in S206, another contact avoidance assistance operation in place of applying the aforementioned predetermined steering torque mentioned in S104 of FIG. 6 flowchart, specifically more effective (in other words, more perceivable) contact avoidance assistance operation as the warning, or the contact avoidance assistance operation by vehicle control is conducted, in other words, the contact avoidance assistance operation is enhanced. When the result in S204 is negative, since it means that the driver recognizes the warning, in S208, the same operation as in S106 is conducted.

Figure 9:
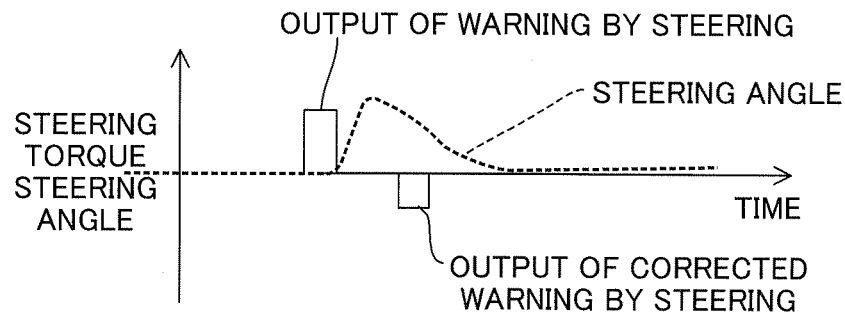
FIG. 9 is an explanatory time chart showing a case of applying steering torque in the opposite direction when a steering angle comes to excessive.

When the steering torque is applied as the warning by steering, if an excessive steering angle is generated in the same direction as the applied steering torque (e.g., rightward) to exceed a third set value (e.g., 10 degrees) as shown in FIG. 9, a correction warning by steering (correction torque) is given in the opposite direction (leftward) in S206.

Since the vehicle safety driving apparatus according to the second embodiment is configured such that a change amount of steering angle of a steering wheel relative to the applied predetermined steering torque is calculated, and the contact avoidance assistance operation is enhanced when the calculated driver's steering force change amount is less than the set value and the calculated steering angle change amount of the steering wheel is less than a second set value, in addition to the effects mentioned above, it becomes possible to improve the estimation accuracy on the driver's perception, thereby enabling to assist the avoidance of contact more appropriately.

Further, Since it is configured such that a change amount of steering angle of a steering wheel relative to the applied predetermined steering torque is calculated, and a correction torque is applied in a direction opposite from a direction in which the predetermined steering torque is applied when the calculated steering angle change amount of the steering wheel is greater than a third set value, in addition to the effects mentioned above, even if the steering torque comes to excessive, the generation of excessive behavior of the vehicle or the like can be prevented.

As mentioned above, the first and second embodiments are configured to have a vehicle safety driving apparatus (10) having: object detection means (imaging device 40, radar device 42, driving control unit 26, S10) for detecting an object (102) present around a vehicle (subject vehicle) 100; motion state detection means (yaw rate sensor 50, driving control unit 26, S12) for detecting a state of motion of the vehicle; contact possibility determination means (S14) for determining a possibility of contact with the detected object based on the detected state of motion; and contact avoidance assistance means (S16 to S34, S100 to S104, S200 to S206) for recognizing the object as an obstacle when it is determined that there is a possibility of contact with the object and for conducting operation of assisting avoidance of contact with the recognized obstacle (conducting contact avoidance assistance control) by a warning or vehicle control, characterized by: steering torque applying means (S24) for applying a predetermined steering torque (e.g., 100 kgfcm) as the warning; and driver's steering force change amount calculation means (S100, S200) for calculating a change amount of driver's steering force relative to the applied predetermined steering torque, and the contact avoidance assistance means conducts contact avoidance assistance operation (S104, S206) in place of applying the predetermined steering torque when the calculated driver's steering force change amount is less than a set value (S102, S204).

It is configured such that the contact avoidance assistance means conducts more perceivable operation as the warning (S104, S206) when the calculated driver's steering force change amount is less than the set value (S102, S204).

It is configured such that, the contact avoidance assistance means conducts the contact avoidance assistance operation by the vehicle control (S104, S206) when the calculated driver's steering force change amount is less than the set value (S102, S204).

It is configured such that the contact avoidance assistance means conducts the contact avoidance assistance operation by the vehicle control and corrects the contact avoidance assistance operation to be safer (S104, S206) when the calculated driver's steering force change amount is less than the set value (S102, S204).

The vehicle safety driving apparatus (10) according to the second embodiment is configured to further includes: steering angle change amount calculation means (S202) for calculating a change amount of steering angle of a steering wheel relative to the applied predetermined steering torque, and the contact avoidance assistance means enhances the contact avoidance assistance operation (S206) when the calculated driver's steering force change amount is less than the set value and the calculated steering angle change amount of the steering wheel is less than a second set value (S204).

Further it is configured to further includes: steering angle change amount calculation means (S202) for calculating a change amount of steering angle of a steering wheel relative to the applied predetermined steering torque, and the contact avoidance assistance means applies a correction torque in a direction opposite from a direction in which the predetermined steering torque is applied (S206) when the calculated steering angle change amount of the steering wheel is greater than a third set value, as illustrated in FIG. 9.

It should be noted that, in the foregoing, although the steering shaft is mechanically connected to the front wheels (drive wheels) through a rack-and-pinion mechanism and the EPS actuator (electric motor) 22 is mounted on the rack to assist the steering, a steer-by-wire system in which the steering shaft and front wheels are mechanically disconnected may be utilized.

INDUSTRIAL APPLICABILITY

According to this invention, in the vehicle safety driving apparatus, it is configured to apply predetermined steering torque, calculate a change amount of driver's steering force relative to the predetermined steering torque, and when the driver's steering force change amount is less than a set value, conduct contact avoidance assistance operation in place of applying the predetermined steering torque, specifically, estimate whether the driver recognizes a warning by determining whether the calculated driver's steering force change amount is less than the set value, and when it is estimated that the warning is not recognized, conduct another contact avoidance assistance operation in place of it. With this, when it is estimated that the warning is not recognized, it becomes possible to conduct more effective operation by a warning or vehicle control, thereby assisting avoidance of contact appropriately.

The invention claimed is:

1. A vehicle safety driving apparatus having:
an object detector that detects an object present around a vehicle;
a motion state detector that detects a state of motion of the vehicle;
a contact possibility determiner that determines a possibility of contact with the detected object based on the detected state of motion; and
a contact avoidance assistance conductor that recognizes the object as an obstacle when it is determined that there is a possibility of contact with the object, and conducts operation of assisting avoidance of contact with the recognized obstacle by a warning or vehicle control,
wherein:
a steering torque applier applies a predetermined steering torque as the warning;
a driver's steering force change amount calculator calculates a change amount of driver's steering force in a direction opposite to a direction of the applied predetermined steering torque,
the contact avoidance assistance conductor conducts contact avoidance assistance operation in place of applying the predetermined steering torque when the calculated driver's steering force change amount is less than a set value,
a steering angle change amount calculator calculates a change amount of steering angle of a steering wheel relative to the applied predetermined steering torque, and
the contact avoidance assistance conductor enhances the contact avoidance assistance operation when the calculated driver's steering force change amount is less than the set value and the calculated steering angle change amount of the steering wheel is less than a second set value.

2. The apparatus according to claim 1, wherein the contact avoidance assistance conductor conducts an operation which is more perceivable for the driver as the warning when the calculated driver's steering force change amount is less than the set value, and wherein the operation which is more perceivable to the driver includes one or more of the following operations: applying a steering torque exceeding a value of the predetermined steering torque, applying a steering torque intermittently, making a steering wheel vibrate, giving an audible warning through a speaker, giving a visible warning through a warning indicator, and tightening of a seatbelt.

3. The apparatus according to claim 1, wherein the contact avoidance assistance conductor conducts the contact avoidance assistance operation by the vehicle control when the calculated driver's steering force change amount is less than the set value.

4. The apparatus according to claim 1, wherein the contact avoidance assistance conductor conducts the contact avoidance assistance operation by the vehicle control and corrects the contact avoidance assistance operation to be safer for the driver when the calculated driver's steering force change amount is less than the set value, and wherein the contact avoidance assistance operation performed by the vehicle control to be safer includes at least one of: increasing a value of the contact avoidance control timing so that the contact avoidance assistance control is performed sooner, increasing a coefficient k used for calculating a steering torque control amount, and increasing a feedback gain used in a feedback control.

5. The apparatus according to claim 1, further including:
steering angle change amount calculator that calculates a change amount of steering angle of a steering wheel relative to the applied predetermined steering torque,
and the contact avoidance assistance conductor applies a correction torque in a direction opposite from a direction in which the predetermined steering torque is applied when the calculated steering angle change amount of the steering wheel is greater than a third set value.

6. The vehicle safety driving apparatus of claim 1, wherein the object detector is configured to detect an object located about a front side of the vehicle.

7. A vehicle safety driving method comprising:
detecting an object present around a vehicle;
detecting a state of motion of the vehicle;
determining a possibility of contact with the detected object based on the detected state of motion;
recognizing the object as an obstacle when it is determined that there is a possibility of contact with the object; and
assisting avoidance of contact with the recognized obstacle by a warning or vehicle control,
wherein:
a predetermined steering torque is applied as the warning;
a change amount of driver's steering force in a direction opposite to a direction of the applied predetermined steering torque is calculated,
assisting avoidance of contact in place of applying the predetermined steering torque is performed when the calculated driver's steering force change amount is less than a set value,
calculating a change amount of steering angle of a steering wheel relative to the applied predetermined steering torque is performed, and
the step of contact avoidance assistance enhances the contact avoidance assistance operation when the calculated driver's steering force change amount is less than the set value and the calculated steering angle change amount of the steering wheel is less than a second set value.

8. The method according to claim 7, wherein the step of contact avoidance assistance conducts an operation which is more perceivable for the driver as the warning when the calculated driver's steering force change amount is less than the set value, and wherein the operation which is more perceivable to the driver includes one or more of the following operations: applying a steering torque exceeding a value of the predetermined steering torque, applying a steering torque intermittently, making a steering wheel vibrate, giving an audible warning through a speaker, giving a visible warning through a warning indicator, and tightening of a seatbelt.

9. The method according to claim 7, wherein step of the contact avoidance assistance conducts the contact avoidance assistance operation by the vehicle control when the calculated driver's steering force change amount is less than the set value.

10. The method according to claim 7, wherein the step of contact avoidance assistance conducts the contact avoidance assistance operation by the vehicle control and corrects the contact avoidance assistance operation to be safer for the driver when the calculated driver's steering force change amount is less than the set value, and wherein the contact avoidance assistance operation performed by the vehicle control to be safer includes at least one of: increasing a value of the contact avoidance control timing so that the contact avoidance assistance control is performed sooner, increasing a coefficient k used for calculating a steering torque control amount, and increasing a feedback gain used in a feedback control.

11. The method according to claim 7, further including the step of:
   calculating a change amount of steering angle of a steering wheel relative to the applied predetermined steering torque,
   and the step of contact avoidance assistance applies a correction torque in a direction opposite from a direction in which the predetermined steering torque is applied when the calculated steering angle change amount of the steering wheel is greater than a third set value.

12. The vehicle safety driving method of claim 7, wherein detecting the object comprises detecting the object located about a front side of the vehicle.

* * * * *